United States Patent [19]

Niedringhaus et al.

[11] Patent Number: 4,874,428
[45] Date of Patent: Oct. 17, 1989

[54] FLUIDIZING A LIME-SILICA SLAG

[75] Inventors: Joyce C. Niedringhaus; Michael L. Lowry, both of Middletown, Ohio

[73] Assignee: Armco Inc., Middletown, Ohio

[21] Appl. No.: 242,981

[22] Filed: Sep. 12, 1988

[51] Int. Cl.$^4$ .............................................. C21C 7/02
[52] U.S. Cl. ........................................ 75/30; 75/53; 75/58; 75/257
[58] Field of Search ......................... 75/30, 53, 58, 257

[56] References Cited

U.S. PATENT DOCUMENTS

| | | | |
|---|---|---|---|
| 2,757,107 | 7/1956 | Heger et al. | 148/12.1 |
| 3,598,170 | 8/1971 | Roberts | 75/257 |
| 3,721,547 | 3/1973 | Dvorak | 75/257 |
| 3,982,929 | 9/1976 | Heck et al. | 75/94 |
| 3,985,546 | 10/1976 | Mrdjenovich | 75/30 |
| 3,998,624 | 12/1976 | Harris | 75/30 |
| 4,126,453 | 11/1978 | Heck | 75/257 |
| 4,147,539 | 4/1979 | Kekish | 75/257 |
| 4,290,809 | 9/1981 | Loane | 75/257 |

FOREIGN PATENT DOCUMENTS

| | | |
|---|---|---|
| 116155 | 7/1984 | Japan . |
| 179704 | 10/1984 | Japan . |
| 235503 | 10/1986 | Japan . |
| 389882 | 11/1973 | U.S.S.R. . |
| 425948 | 10/1974 | U.S.S.R. . |
| 495365 | 3/1976 | U.S.S.R. . |
| 508531 | 6/1976 | U.S.S.R. . |
| 802370 | 2/1981 | U.S.S.R. . |
| 827551 | 5/1981 | U.S.S.R. . |

*Primary Examiner*—Peter D. Rosenberg
*Attorney, Agent, or Firm*—R. J. Bunyard; L. A. Fillnow; R. H. Johnson

[57] ABSTRACT

A method of fluidizing a cold lime-silica slag covering a molten metal. An acid flux is prepared from a particulate admixture of sodium fluoroaluminate and sodium silicate. The flux is mixed with the cold slag forming a fluid slag having at least 1% by weight F− and at least 1% by weight $Na_2O$. The treated slag has a reduced melting point allowing it to be mechanically skimmed from the molten metal and has a high sulfur capacity.

13 Claims, No Drawings

FLUIDIZING A LIME-SILICA SLAG

BACKGROUND OF THE INVENTION

The invention relates to a method of using an acid flux for lowering the melting point of a lime-silica slag. More particularly, the invention relates to a method of using an acid flux for lowering the melting point of a blast furnace slag for the production of steel from molten carbon saturated iron.

It is well known the primary charge material for steel manufacturing in an oxygen refining furnace is molten iron smelted in a blast furnace. The charge material may also include various fluxing agents and cold ferrous scrap. Low carbon steels for deep drawing applications such as automotive parts must have very low levels of impurities. For example, the steel specification for sulfur may be as low as 0.010% by weight. However, molten iron from a blast furnace frequently includes as much 0.03% by weight or more sulfur. Accordingly, sulfur may have to be removed from the molten iron prior to refining or from the steel after refining. As is well understood by those skilled in the art, the preferred practice of desulfurization is to remove sulfur from the molten iron prior to charging the molten iron into a steel refining furnace. For the later type of desulfurization, molten iron from a blast furnace may be cast into a transfer car such as a torpedo car. Blast furnace slag, entrained with the molten iron during the cast at the blast furnace, forms an insulative cover over the molten iron in the transfer car. The molten iron then is transported to a desulfurization station where a desulfurization agent may be injected into the transfer car or the molten iron may be poured first into a transfer pot such as a ladle with the desulfurization agent being injected into the molten iron while in the transfer pot. In any event, sulfur removed from the molten iron by the desulfurizing agent is retained in the slag and the slag must be removed to prevent sulfur from reverting back to the steel during refining. Otherwise, additional desulfurization may be required during or after refining.

For various reasons, the temperature of the molten iron in the transfer pot may be below that necessary for the slag to be in a fluid condition. Even if desulfurization of the molten iron is not required, the blast furnace slag is ladened with sulfur removed during smelting and should not be transferred to the steel refining furnace. This slag normally is removed from the transfer pot by racking or skimming from the upper surface of the molten iron. If the slag has solidified or has insufficient fluidity, it cannot be removed. For molten iron requiring desulfurization, a cold slag is even more likely because a temperature drop of 30° F. (17° C.) or more in the molten iron can occur while injecting the desulfurization agent. More importantly, desulfurization agents normally contain lime. Adding additional lime may further raise the melting point of the slag.

It is well known to use a flux including a fluoride ion ($F^-$) source to increase slag fluidity by lowering the melting point of the slag. Fluoride containing materials for this purpose include fluorspar, cryolite and sodium fluoride.

It is also well known to include soda based materials in a flux to not only increase slag fluidity but also to remove impurities such as phosphorus and sulfur from molten metals. Soda based materials for these purposes include soda ash, sodium silicate, borax and cryolite.

Nevertheless, there remains a need to further reduce the melting point of a lime-silica type slag requiring a high sulfur capacity. More particularly, a process is needed to increase the fluidity of a lime-silica slag by adding a flux to a molten metal forming a flux treated slag having good chemical stability, good refining removal characteristics, and causing minimal erosion to vessel refractory linings. For example, basic slag after desulfurization of carbon saturated molten iron may contain 40% by weight or more lime. These slags tend to solidify at molten iron temperatures of about 2300° F. (1260° C.) even though the iron solidifies at a temperature of about 2125° F. (1162° C.). Low fluidity slags have diminished dephosphorization and desulfurization characteristics and are difficult to remove from the molten metal. Accordingly, there remains a need to fluidize lime-silica type slags especially in the temperature range of 1162°–1260° C. so that they can be removed from the molten metal using mechanical skimming equipment, have good refining characteristics especially for sulfur and phosphorus, have high sulfur capacity, have good chemical stability, and case minimal erosion to refractory linings. We have determined for satisfactorily reducing the melting point of lime-silica slags it is necessary to maintain a proper balance of fluoride ion and sodium oxide in the final slag composition. More particularly, for slags containing a high lime content, it is necessary to maintain a proper balance between fluoride ion, and the oxides of sodium, calcium, silicon and aluminum.

BRIEF SUMMARY OF THE INVENTION

The invention relates to a method of using an acid flux to lower the melting point of a lime-silica type slag. The flux contains a source of fluoride ion and sodium salt. When the flux is mixed with the slag, the resulting treated slag contains at least about 1% by weight $F^-$ and at least about 1% by weight $Na_2O$.

It is a principal object of this invention to reduce the melting point of a lime-silica type slag.

It is another object of the invention to reduce the melting point of a blast furnace slag while maintaining the sulfur capacity of the slag.

One feature of the invention is to mix an acid flux containing a source of fluoride ion and sodium salt with a lime-silica type slag so that the composition of the resulting treated slag contains at least about 1% by weight $F^-$ and at least about 1% by weight $Na_2O$.

Another feature of the invention is to fluidize a cold slag by mixing an acid flux containing a source of fluoride ion and sodium salt with a lime-silica type slag covering molten iron having a temperature no greater than 1260° C.

Another feature of the invention is to mix an acid flux containing a source of fluoride ion and sodium salt with a lime-silica type slag to prevent sulfur reversion from the treated slag after a desulfurization agent has been injected into molten iron.

Another feature of the invention is to mix an acid flux containing a source of fluoride iron and sodium salt with a lime-silica type slag so that the composition of the treated slag after desulfurization of molten iron contains at least about 1% $F^-$, at least about 1% $Na_2O$, 30–40% $CaO$, 30–40% $SiO_2$, 10–15% $MgO$ and 8–12% $Al_2O_3$, all percentages by weight.

Another feature of the invention is to mix an acid flux consisting essentially of an admixture of one or more particulate constituents selected from the group of sodium fluoroaluminate, sodium silicate, silicon, silica, aluminum and alumina with a lime-silica type slag.

An advantage of the invention is the reduction of a slag melting point using a less expensive flux.

DETAILED DESCRIPTION OF THE PREFERRED EMBODIMENT

The following are non-limiting examples of a preferred embodiment of the invention. An acid flux was prepared by mixing 1250 lbs. (567 kg) of commercially available recycled crushed bottle glass (sodium silicate) having a particle size of 1 inch (2.5 cm) and smaller with the same amount and size of recycled crushed pot lining from an aluminum production line. Bottle glass is a very inexpensive and stable form of soda having the sodium oxide chemically tied up as $Na_2O \cdot nSiO_2$. Likewise, an aluminum pot lining is a very inexpensive material containing a stable phase of cryolite (sodium fluoroaluminate) and is a source of sodium oxide and fluoride ions. The approximate compositions in percent by weight of these two materials were as follows:

| Glass | Pot Lining |
|---|---|
| $SiO_2 = 73$ | $Al_2O_3 = 28$ |
| $Na_2O = 14$ | $Na_2O = 19$ |
| $CaO = 9$ | $F^- = 16$ |
| $MgO = 4$ | $C = 33$ |
| | Balance = Ca, $SiO_2$, Fe oxide |

Approximately 212 tons (192 MT) of molten iron were cast from a blast furnace into a torpedo type transfer car. Approximately 5 tons (4.5 MT) of a lime-silica type blast furnace slag having a composition of 39% CaO, 39% $SiO_2$, 10% MgO, and 9% $Al_2O_3$, all percentages by weight, covered the molten iron. The molten iron was transferred to a desulfurization station. The molten iron contained 0.063% by weight sulfur and had a temperature of about 2245° F. (1229° C.). The slag was dark in color and crusty in appearance. The operator was instructed to pour between 30–70 tons (27–64 MT) of the "cold" molten iron into a ladle. The flux was then dumped into the ladle and became thoroughly mixed with the cold slag from the torpedo car as the remainder of the molten iron was poured into the ladle. The temperature of the molten iron in the ladle was 2213° F. (1212° C.). The molten iron was then injected with 1389 lbs. (630 kg) of a lime based desulfurization agent for 18 minutes. After desulfurization, the temperature of the molten iron was 2188° F. (1198° C.) and the sulfur content was reduced to 0.005% by weight. The slag cover on the treated molten iron now had a bright orange color and appeared very fluid. This slag was easily skinned from the surface of the treated molten iron using a mechanical rake. The basicity of the blast furnace slag from the analysis above prior to addition of the desulfurization agent and slag fluidizer flux was 1.0. However, the basicity of the slag would have increased to 1.4 after desulfurization had the acid flux not been added to the molten iron. The analysis of the slag after addition of the slag fluidizer flux and desulfurization was 35% CaO, 34% $SiO^2$, 13% MgO, 9% $Al_2O_3$, 2.1% $F^-$ and 3.4% $Na_2O$, all percentages by weight. The slag basicity was now 1.1. The slag basicity was substantially reduced by adding the acid flux, i.e. containing $SiO_2$ and $Al_2O_3$, from what the basicity would have been after adding the lime based desulfurization agent had the acid flux not been added. The basicity (B/A) was determined by dividing the sum of CaO and MgO by the sum of $SiO_2$ and $Al_2O_3$. After the slag had been removed from the surface of the treated molten iron, the treated molten iron was analyzed again and found to have only 0.002 percent by weight sulfur. Even though the slag basicity was substantially reduced from what it would have been by the silica contained in the glass and alumina contained in the pot lining, sulfur removed to the slag during desulfurization did not revert back into the treated molten iron during the skimming operating.

Six additional casts of cold molten iron were flux treated and desulfurized in a manner similar to Example 1 above. The results of all treatments are summarized in Table 1.

TABLE 1

| Test No. | Metal Temp. In Torpedo Car (°C.) | Metal Temp. In Ladle Before Desulf. (°C.) | Desulf. Injection Time (min) | Metal Temp. In Ladle After Desulf. (°C.) | Observation of Skimming Operation |
|---|---|---|---|---|---|
| 1 | 1229 | 1212 | 18 | 1198 | very fluid slag |
| 2 | * | 1232 | 13 | 1214 | easy skim |
| 3 | * | 1260 | 17 | 1243 | very fluid slag |
| 4 | 1206 | 1199 | 10 | 1194 | fuming but slag broke up easily |
| 5 | * | 1176 | 9 | 1169 | large slag lump broke up easily |
| 6 | 1198 | 1178 | 18 | 1169 | easy skim |
| 7 | 1171 | * | 16 | 1161 | difficult skim and severe skulling of iron in ladle |

*not measured

The sulfur analyses in percent by weight of the molten iron before and after desulfurization are shown in Table 2.

TABLE 2

| Test No. | Before Desulfurization | After Desulfurization | After Skimming |
|---|---|---|---|
| 1 | .063 | .005 | .002 |
| 2 | .061 | .003 | * |
| 3 | .074 | .003 | * |
| 4 | .041 | .003 | .004 |
| 5 | .027 | .006 | .004 |
| 6 | .087 | ** | .007 |
| 7 | .035 | * | .002 |

*not measured
**bad test

The initial slag analyses in percent by weight before treatment of Examples 1–7 are shown in Table 3.

TABLE 3

| Test No. | CaO | SiO₂ | MgO | Al₂O₃ | Na₂O | B/A |
|---|---|---|---|---|---|---|
| 1 | 39 | 39 | 10 | 9 | 0 | 1.0 |
| 2 | 37 | 40 | 11 | 9 | .7 | 1.0 |
| 3 | 40 | 38 | 10 | 9 | 0 | 1.1 |
| 4 | 40 | 38 | 10 | 8 | 0 | 1.1 |
| 5 | 38 | 41 | 11 | 8 | 0 | 1.0 |
| 6 | 41 | 37 | 12 | 9 | 0 | 1.2 |
| 7 | 38 | 39 | 13 | 8 | 0 | 1.1 |

The slag analyses in percent by weight after addition of the fluidizer and after desulfurization are shown in Table 4.

TABLE 4

| Test No. | CaO | SiO₂ | MgO | Al₂O₃ | F⁻ | Na₂O | B/A |
|---|---|---|---|---|---|---|---|
| 1 | 35 | 34 | 13 | 9 | 2.13 | 3.42 | 1.1 |
| 2 | 34 | 36 | 13 | 9 | 1.73 | 3.34 | 1.0 |
| 3 | 36 | 34 | 13 | 9 | 2.10 | 3.38 | 1.1 |
| 4 | 37 | 36 | 11 | 8 | 1.29 | 2.24 | 1.1 |
| 5 | 34 | 39 | 11 | 9 | 1.35 | 2.42 | .9 |
| 6 | 37 | 33 | 14 | 9 | 2.01 | 3.24 | 1.2 |
| 7 | 35 | 35 | 14 | 9 | 1.75 | 2.84 | 1.1 |

As clearly demonstrated above, lime-silica type slags that were starting to solidify and would otherwise have been difficult to remove from the molten iron having a temperature of about 2300° F. (1260° C.) or less were fluidized by mixing an acid flux having a source of fluoride ion and sodium salt with the slag. A treated slag was formed containing at least about 1% by weight fluoride and at least about 1% by weight sodium oxide. The slag from Example 7 was difficult to remove because the iron was beginning to solidify. It is also believed beneficial for increasing the slag fluidity to include alumina and/or silica with the flux so that the final slag composition contains at least 30% by weight silica and at least 8% by weight alumina. To prevent sulfur reversion from blast furnace slag covering molten iron not requiring desulfurization or slags heavily ladened with sulfur covering molten iron having been desulfurized, the treated slag preferably should contain at least 2% Na₂O, no more than about 40% SiO₂ and no more than about 12% Al₂O₃, all percentages by weight. Even though the slag basicity (B/A) was reduced down to about 1.0 or less after desulfurization, minimal or no sulfur reversion during the slag skimming operation occurred because of the Na₂O content in the slag.

Recycled pot lining from an aluminum production line was chosen as a source of fluoride ion because it is an inexpensive source of cryolite. The purpose for the fluoride addition is for lowering the melting point of the slag. Since pot lining does contain alumina, relatively pure cryolite or other well known sources of fluoride ion could be used for those slags where additional alumina is undesirable. Alternatively, aluminum dross or aluminum could also be included as part of the flux if higher additions of alumina are necessary to increase slag fluidity. Of course, additions of silica or silicon could also be included with the flux to increase fluidity.

Fluoride is known to be very erosive to refractory and therefore should not exceed 10% by weight in the treated slag. To minimize refractory erosion, it is preferred the fluoride not exceed about 3% by weight in the treated slag.

Good dephosphorization and desulfurization are dependent upon high slag fluidity. In addition, good dephosphorization is dependent upon having a low molten metal temperature. As indicated above, at least about 1% by weight F⁻ is necessary for high slag fluidity. Sodium oxide is included in the flux because a treated slag having at least about 1%, preferably at least 2%, by weight Na₂O has increased sulfur capacity. For molten metal requiring dephosphorization and/or desulfurization, treated slag containing up to 20% by weight Na₂O can be formed because a flux containing higher concentrations of sodium salt will simultaneously remove phosphorous and sulfur when mixed with a molten metal. For this later purpose and to minimize refractory erosion, a second source of a stable form of a sodium salt free of fluoride ion is desirable to obtain a higher concentration of Na₂O in the treated slag. Unlike most of the sources of sodium oxide such as soda ash and cryolite which are unstable, commercial bottle glass (sodium silicate) is a very stable form of sodium oxide at molten iron temperatures. We have determined that a flux including sodium silicate and cryolite can be used ot form a highly desirable treated slag. The treated slag is very fluid at low temperature, e.g. no greater than 1260° C., causes minimal refractory erosion, e.g. F⁻ no greater than about 3% by weight, and has good desulfurization and dephosphorization characteristics, e.g. Na₂O about 2–4% by weight.

Various modifications can be made to the invention without departing from the spirit and scope of it. Therefore, the limits of the invention should be determined from the appended claims.

What is claimed is:

1. A method of fluidizing a slag, comprising:
   providing a lime-silica type slag covering a molten metal,
   providing an acid flux containing a source of fluoride ion and complex sodium compound,
   mixing said acid flux with said lime-silica slag to form a treated slag containing at least about 1% by weight F⁻ and at least about 1% by weight Na₂O, whereby the melting point of said treated slag is below the melting point of said lime-silica slag,
   removing said treated slag from said molten metal.

2. The method of claim 1 wherein said flux is prepared from a particulate admixture of sodium fluoroaluminate and sodium silicate.

3. The method of claim 2 wherein said mixture includes recycled cryolite and recycled bottle glass.

4. The method of claim 1 wherein said treated slag comprises 30–40% CaO, 30–40% SiO₂, 10–15% MgO, and 8–12% Al₂O₃, all percentages by weight.

5. The method of claim 4 wherein said treated slag further includes 1–3% by weight F⁻ and 2–4% by weight Na₂O.

6. A method of fluidizing a slag, comprising:
   providing a blast furnace slag covering a molten iron, the temperature of said molten iron being no greater than about 1260° C.,
   preparing an acid flux containing a source of fluoride ion and complex sodium compound,
   mixing said acid flux with said slag forming a fluid treated slag containing at least about 1% by weight F⁻ and at least about 1% by weight Na₂O,
   removing said treated slag from said molten iron.

7. The method of claim 6 wherein said treated slag has a melting point of at least 1169° C.

8. A method of fluidized a slag, comprising:
   providing a blast furnace slag covering a molten iron, preparing an acid flux containing a source of fluoride ion and complex sodium compound, mixing said acid flux with said slag to form a fluid treated slag, injecting a desulfurization agent into said molten iron, said treated slag containing at least about 1% by weight $F^-$ and at least about 1% by weight $Na_2O$, removing said treated slag from said molten iron whereby sulfur in said treated slag does not revert to said molten iron.

9. The method of claim 8 wherein said treated slag further includes at least 2% by weight $Na_2O$ to remove impurities from said molten iron.

10. A method of fluidizing a slag, comprising:

providing a blast furnace slag covering a molten iron, the temperature of said molten iron no greater than about 1260° C., preparing an acid flux comprising a particulate admixture of sodium fluoroaluminate and sodium silicate, mixing said acid flux with said slag forming a fluid treated slag, injecting a desulfurization agent into said molten iron, removing said treated slag from said molten iron, said treated slag comprising at least about 1% $F^-$, at least about 1% $Na_2O$, 30–40% CaO, 30–40% $SiO_2$, 10–15% MgO, 8–12% $Al_2O_3$, all percentages by weight, whereby sulfur in said treated slag does not revert to said molten iron.

11. The method of claim 10 wherein said treated slag has a melting point of at least 1169° C.

12. The method claim 10 wherein said admixture includes one or more materials from the group consisting essentially of recycled aluminum pot lining, recycled bottle glass, silicon, silica, aluminum, and alumina.

13. The method of claim 10 wherein said treated slag further includes 1–3% by weight $F^-$ and 2–4% by weight $Na_2O$ to remove impurities from said molten iron.

* * * * *